Sept. 30, 1941.                D. G. SMELLIE                    2,257,540
                          AIR CONDITIONING SYSTEM
                           Filed June 25, 1936              2 Sheets-Sheet 1

INVENTOR
Donald G. Smellie
BY
Harry S. Dumarse
ATTORNEY

Sept. 30, 1941.   D. G. SMELLIE   2,257,540
AIR CONDITIONING SYSTEM
Filed June 25, 1936   2 Sheets-Sheet 2

INVENTOR
Donald G. Smellie
BY Harry S. Dumarse
ATTORNEY

Patented Sept. 30, 1941

2,257,540

UNITED STATES PATENT OFFICE 2,257,540

AIR CONDITIONING SYSTEM

Donald G. Smellie, Canton, Ohio, assignor to The Hoover Company, North Canton, Ohio, a corporation of Ohio Application June 25, 1936, Serial No. 87,164

20 Claims. (Cl. 257—3)

This invention relates to air conditioning apparatus and more particularly to means for maintaining the proper temperature in a dwelling or other building at all times of the year.

It is known to provide a heating system for a dwelling house or the like and it is known to provide a heat operated refrigerating system for cooling air in a dwelling house or the like.

It is an object of the present invention to provide a simple and compact system for either heating or cooling the air in a room to maintain the same temperature therein throughout the year and to provide an arrangement in which only a single source of heat such as a boiler of an ordinary house heating system may be used either to heat the air in the dwelling or to supply heat to a heat-operated refrigerating system to cool the air.

It is another object of the invention to provide both heating and cooling apparatus for conditioning air in a room and to provide novel switching means for conveying heat either to the heater for the air in the room or to cooling apparatus arranged to cool the air in the room.

It is still another object of the invention to provide a novel control system to be used in connection with an arrangement for either heating or cooling air in a room.

Other objects and advantages reside in certain novel features of the arrangement and construction of parts as will be apparent from the following description taken in connection with the accompanying drawings in which.

Figure 1:
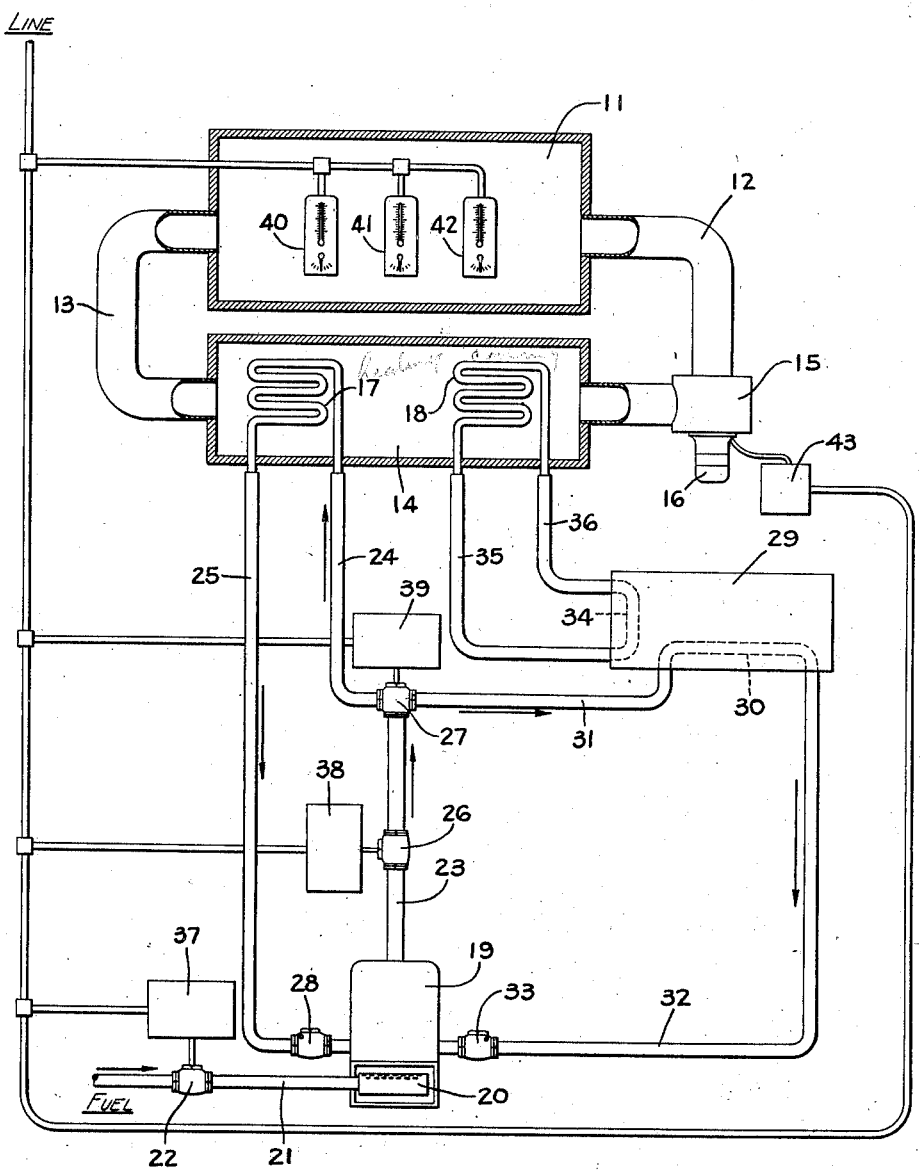
Figure 1 is a diagrammatic representation of a heating and cooling system for maintaining the proper temperature in the room together with an arrangement of controls for maintaining the proper temperature in a room throughout the entire year.

Referring to the drawings in detail and first to the arrangement of Figure 1, it will be seen that a room in which the air is to be maintained at the proper temperature for habitation is shown at 11, this room being connected by air conduits 12 and 13 to a conditioning chamber 14. A fan or blower 15 is incorporated in the air conduit 12, the blower being driven by an electric motor 16 connected to a source of electric supply as will presently be described.

The conditioning chamber 14 contains a heating coil 17 and a cooling coil 18. In accordance with the present invention when the air in the room 11 is below the desired temperature, heat is supplied to the heating coil 17 and when the air in the room 11 is above the desired temperature, cooling is effected by means of the coil 18. In this way the temperature of the room may be maintained at the same temperature throughout the year, or the temperature may be varied, if desired, in accordance with the wishes of the occupant.

To effect the heating or cooling by means of the coils 17 and 18, a steam boiler or heating device of the conventional type may be located in the basement of the building, this boiler being shown at 19 in the arrangement of Figure 1. The boiler 19 may be heated by means of the burner 20, this burner being supplied with fluid fuel through the conduit 21, the supply of fuel being controlled by means of a control valve 22 in the pipe 21. Any other source of heat may, of course, be employed, instead of the boiler 19.

The boiler 19 may be connected to the heating coil 17 by means of the steam pipes 23, 24 and 25, the pipe 23 containing a modulating valve 26, a switching valve 27 and the pipe 25 having a check valve 28 at its lower end.

The apparatus also includes a refrigerating system diagrammatically illustrated at 29. This refrigerating system may be any heat operated refrigerating device such as an absorption refrigerator system or a jet compressor system. Since these types of refrigerating apparatuses are well known, they are not described in this specification. The refrigerating system 29 may be caused to operate by means of a heating coil or element 30 therein which is connected to the boiler 19 by means of the pipes 31 and 32. The pipe 32 contains a check valve 33 and the pipe 31 is connected to the switching valve 27 of the pipe 23.

For transferring cold from the refrigerating apparatus 29 to the cooling coil 18 a brine system may be used as illustrated, this brine system including a coil or element 34 associated with the cold part of the refrigerating system. This element 34 may be connected to the cooling coil 18 by means of the conduits 35 and 36.

The check valves 28 and 33 are so constructed as to permit fluid to flow from the pipes 25 and 32 respectively into the boiler 19 and to prohibit the flow of fluid out of the boiler 19 through the pipes 25 and 32. In place of check valves electrically controlled valves may be employed in accordance with known practice.

For controlling the operation of the system a fuel valve 22 is provided with an electrical control box 37. Likewise the modulating valve 26 is provided with electrical control apparatus in the box 38 and the switching valve 27 is provided with electrical control apparatus in the control box 39 and the motor 16 is provided with control apparatus in box 43. The apparatus in these boxes is regulated by means of thermostats located in the room 11 or elsewhere in the system. The arrangement shown in Figure 1 includes three thermostats designated 40, 41 and 42 which may be of the usual construction and manually adjustable within certain ranges to cause the apparatus to maintain the proper temperature in the room 11.

Figure 2:
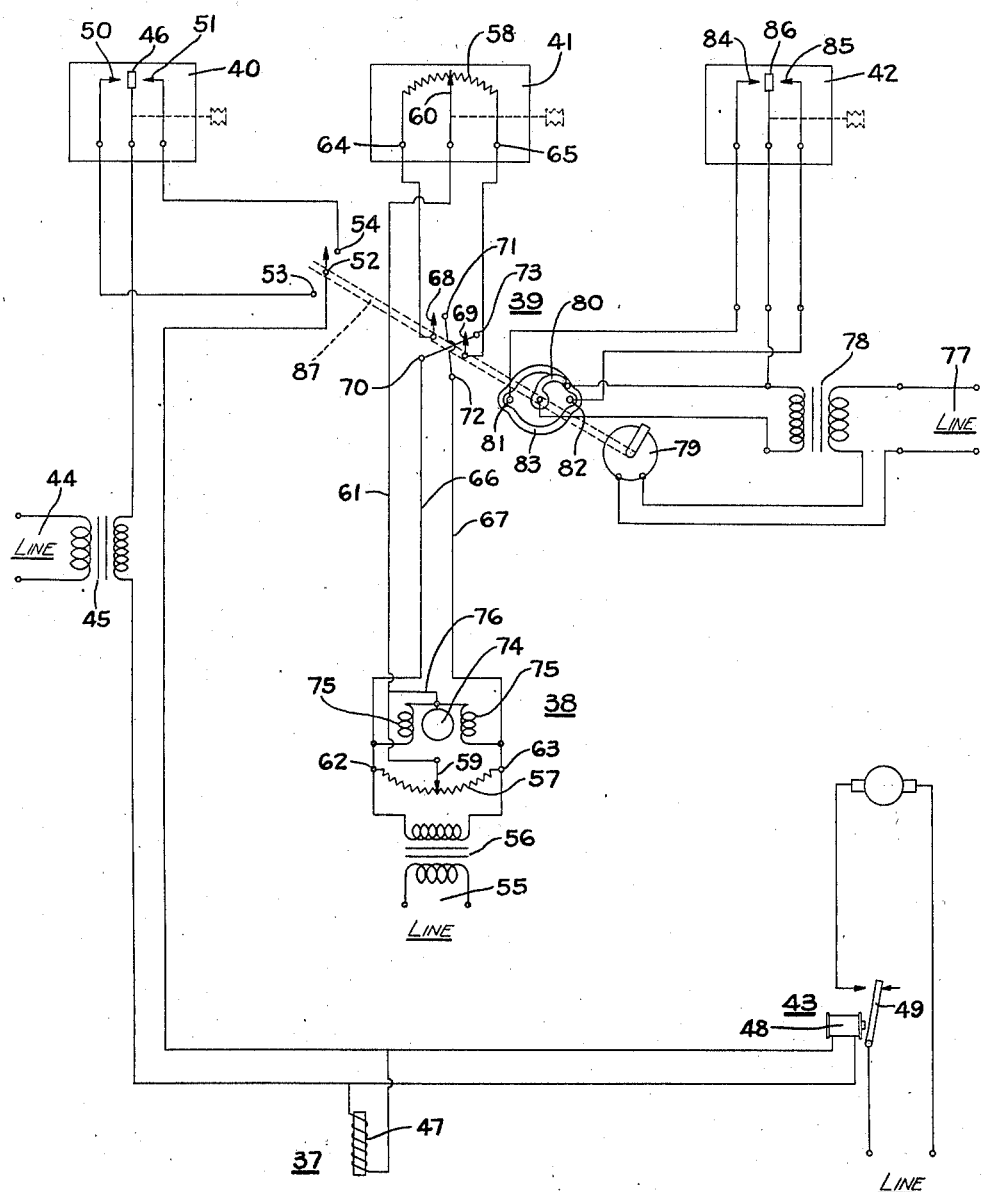
Figure 2 is an electrical diagram of a control system used in the arrangement of Figure 1.

The circuits for the electrical control systems for the apparatus are shown in Figure 2 in which the position of the various control elements is somewhat similar to their position in the arrangement of Figure 1. The three thermostats of Figure 2 are designated the same as in Figure 1, namely, 40, 41 and 42.

From an inspection of Figure 2, it will be clear that there are three separate control circuits employed. The thermostat 40 is connected into a circuit with the control devices 37 and 43 which control the valve 22 and the electric motor 16. This circuit may be referred to as the daily control circuit.

The thermostat 41 is connected in a circuit with the element 38 which controls the modulating valve 26 and this circuit may be referred to as the modulating control circuit.

The thermostat 42 is connected with the element 39 and this circuit may be referred to as the seasonal control circuit.

By means of switches which will presently be described, the seasonal control circuit reverses certain connections in the daily control circuit and in the modulating control circuit to bring about the desired operation of the system.

The daily control circuit controlled by the thermostat 40 includes a source of supply as indicated at 44, a transformer 45 being provided to reduce the voltage in the control circuit. The secondary of the transformer 45 is connected to the movable element 46 of the thermostat 40 in series with the coil of a solenoid 47 which actuates the fuel valve 22 and also in series with an electromagnet 48 which operates the switch 49 to energize the electric motor 16.

It will be noted that the thermostat 40 has two contact elements 50 and 51 on opposite sides of the movable element 46 thereof and that these contacts 50 and 51 are connected to the opposite terminals of a single pole double throw switch 52, the poles of which are designated 53 and 54. It will be apparent that when the switch 52 contacts the lower terminal 53, movement of the element 46 of the thermostat 40 to contact the terminal 50 will close a circuit to both the solenoid 47 and the electromagnet 48. These elements would then open the fuel valve 42 and cause the motor 16 to operate the blower 15.

Likewise when the switch 52 is moved to contact the terminal 54 and when the movable element 46 contacts the terminal 51 of the thermostat, the circuit to the solenoid 47 and the electromagnet 48 will also be closed so that the fuel valve 22 will again be opened and the motor 16 energized.

The modulating control circuit includes a source of supply 55 connected to a transformer 56, the secondary of which is connected to two resistances 57 and 58 in parallel, the resistance 57 being in the control box 38 and the resistance 58 being associated with the thermostat 41. The resistances 57 and 58 have variable contact members 59 and 60 associated therewith and connected to each other by means of the electrical conductor 61. The terminals 62 and 63 of the electrical resistance 57 are connected to the terminals 64 and 65 of the electrical resistance 58 by means of the electrical conductors 66 and 67. The conductors 66 and 67 include a double pole double throw switch, the movable elements of which are designated 68 and 69. The arm 68 being adapted to contact either the contact points 70 or 71 and the arm 69 being adapted to contact either of the terminals 72 or 73. The double pole, double throw switch is thus a reversing switch located in the electrical conductors 66 and 67.

Also located within the control box 38 is an electric motor 74 which is provided with suitable windings 75 connected in parallel with the resistances 57 and 58. The electric motor 74 is so designed as to move the contact point 59 across the resistance 57. By means of an electrical conductor 76 the mid point of the windings 75 is connected to the electrical conductor 61.

It will thus be clear that the modulating control circuit constitutes a Wheatstone bridge arrangement of the type in which movement of the contact element 60 of the thermostat 41 will cause movement of the contact element 59 in the control box 38 a similar distance until the bridge is balanced, the winding 75 for the electric motor 74 being so connected as to operate differentially and cause the movement of the contact member 59 until the bridge is balanced.

By means not shown the electric motor 74 is connected through a gear train or other suitable mechanism to the modulating valve 26 of the arrangement of Figure 1 so that this valve is open or closed slightly depending upon the temperature conditions to which the actuating element of the thermostat 41 is exposed. Assuming for example that it is wintertime and that the contact members 68 and 69 of the double pole, double throw switch are contacting the terminals 70 and 72, contraction of the thermostatic element associated with the thermostat control device 41 as the result of a lowering of the temperature in the room, causes the contact arm 60 to move slightly to the right. This will cause the motor 74 to move the contact point 59 to the right also until the bridge is balanced. This will open the modulating valve 26 to permit more steam to pass to the heating element 17 (assuming the switching valve 27 is in a position to permit steam to pass from the pipe 23 into the pipe 24), and this will cause the air in the conditioning chamber 14 to be heated and circulated into the room 11 by means of the conduits 12 and 13 and the blower 15, until the temperature of the room is raised sufficiently to cause the thermostatic element of the thermostatic control 41 to move the contact 60 slightly to the left in which case the contact element 59 will also be moved to the left to balance the Wheatstone bridge so that the modulating valve 26 closes slightly to reduce the amount of steam flowing to the heating coil 17 and thus maintain the desired temperature in the room 11.

If it is summertime, on the other hand, and if the double pole, double throw switch is in the position with its movable arms 68 and 69 contacting the terminals 71 and 73, the connections of the bridge will be reversed and if the temperature in the room 11 rises above the desired point the thermostatic elements of the thermostatic control 41 will expand and move the control arm 60 to the left. Since the connections of the resistances 58 and 57 are now reversed, this will unbalance the bridge in such a way as to cause the motor 74 to move the arm 59 to the right thus opening the modulating valve 26 and permitting steam to pass from the pipe 23 through the heating element 30 of the refrigerating system (assuming the switching valve 27 is now in position to permit this flow) and this will cause the production of more cold by the refrigerating system which will lower the temperature of the cooling coil 48 and reduce the temperature in the room 11. When the desired low temperature is reached, the thermostatic element will move the control arm 60 back to the right and thus cause the control arm 59 to move back to the left, as view in Figure 2, and again balance the bridge so as to reduce the amount of steam flowing to the heating coil 30 of the refrigerating system, allowing the temperature of the cooling coil 18 to rise.

Thus, accurate means for modulating or definitely controlling the temperature in the room is provided by the modulating circuit.

The seasonal control circuit includes a source of supply designated 77 which is connected to a transformer 78 the primary of which is in series with an electric motor 79. The motor 79 is so connected that it rotates only when the secondary of the transformer 78 is closed. The motor 79 performs several functions. It is connected directly to the switching valve 27 in such a way as to cause the valve to connect the steam conduit 23 either to the steam conduit 31 or the steam conduit 24 depending upon the movement of the armature of the motor 79. The motor 79 also operates the single pole switch 52 in the daily control thermostat circuit and the double pole, double throw switch in the modulating control circuit. The motor 79 may accordingly be termed the seasonal control motor. If the atmospheric temperature varied only uniformly throughout the year, it would operate only in the spring and fall to switch the supply of steam from the heating coil 17 in the winter to the refrigerating apparatus 29 in the summer. The motor 79 will of course operate more than twice a year, however, since the temperatures vary greatly in the fall and spring.

The motor 79 is provided with the conventional switching arrangement connected to the secondary of the transformer 78 this switching arrangement consisting of a movable arm 80 which contacts either of the terminals 81 or 82 under normal conditions and which travels over a contact ring 83 in moving from either terminal 81 or 82 to the other. The contact terminals 81 and 82 are connected to the contact points 84 and 85 located on opposite sides of the movable arm 86 of the thermostat 42. Assuming, therefore, that the contact arm 80 is in contact with the terminal 82 and that the movable element 86 contacts the point 85, the arm 80 will be moved to the arm 81 as the motor 79 rotates 180 degrees. Likewise assuming the contact arm 80 is in contact with the terminal 81, the motor 79 will move another 180 degrees when the movable element 86 of the thermostat contacts the terminal 84.

The electric motor 79 is illustrated as controlling a shaft 87 upon which the arm 80, the movable arms 68 and 69 of the double pole, double throw switch of the modulating circuit, the movable arm 52 of the single pole, double throw switch of the daily control circuit are all mounted. The shaft is designated 87 and is illustrated by dotted lines. The shaft also is connected to the switching valve 27 in accordance with known construction.

The electrical control circuit shown is intended to illustrate only one way for carrying out the principles of the invention. It will be apparent to those skilled in the art that other control circuits may be employed and that it may be unnecessary to employ three separate thermostats for the system but these have been illustrated on the drawings for purposes of simplicity in explanation.

It will also be apparent to those skilled in the art that many additional controls may be provided, such as controls for limiting steam pressure developed in the boiler 19 and also for controlling the operation of the refrigerating system or other parts of the apparatus.

It will also be apparent that the control arrangement shown renders the apparatus fully automatic throughout the entire year, the seasonal control circuit being actuated in response to wide variations in temperature in the room, the daily control circuit controlling the supply of fuel to the boiler 19 and the circulation of air between the room 11 and the conditioning chamber 14 and the modulating circuit controlling the temperature in the room in response to slight variations in temperature therein.

While only one embodiment of the invention has been shown and described herein, it is obvious that various changes may be made in the arrangement and construction of parts without departing from the spirit of the invention or the scope of the annexed claims.

I claim:

1. The method of controlling an air conditioning system involving a source of heat, means for transferring heat to the air to be conditioned, a heat operated refrigerating system for cooling the air to be conditioned, and means for selectively supplying heat to said heating means or said refrigerating system; which includes the steps of supplying heat to said heating means or refrigerating system in response to changes in room temperature, modulating the heat so supplied in response to changes in room temperature, and controlling the operation of the source of heat in response to room temperature.

2. Apparatus for conditioning the air in a room comprising means for generating steam, a heat operated refrigerating system for cooling the air in said room, means for selectively conducting steam from said steam generating means into heat exchange relation with air to be conditioned or to said refrigerating system in response to changes in the condition of the air in said room, and means operative to vary the quantity of steam supplied in response to relatively small changes in room temperature.

3. Apparatus for conditioning the air in a room comprising, a source of heat, means for conveying heat from said source to the air to be conditioned, a heat operated refrigerating system, means for cooling the air to be conditioned by said refrigerating system, means for conveying heat from said heat source to said refrigerating system, means for selectively directing the heat from said source into either of said conveying means, means for varying the quantity of heat supplied to said selecting means, seasonal control means operative to control said selecting means to supply heat to said heating means of said refrigerating system in response to seasonal demands, means responsive to minor room temperature changes to control said varying means, and means operated by said seasonal control means operative to cause said varying means to decrease the heat supply to said heating means upon a rise in room temperature when the seasonal control means has operated to raise the air to be heated and to increase the heat supply to said refrigerating system upon a rise in room temperature when the seasonal control has operated to cause the air to be cooled.

4. An apparatus as described in claim 3 having means responsive to room temperature operative to start and stop operation of said source of heat, and means responsive to said seasonal control means operative to cause said heat source control means to initiate operation of said heat source upon a fall in room temperature when the air is to be heated and to initiate operation of said heat source upon a rise in room temperature when the air is to be cooled.

5. Air conditioning apparatus comprising heating means, cooling means, control means for modulating the heating or cooling effect as the conditioned air approaches the control point on a heating or cooling cycle, respectively, and means for changing over said apparatus from heating to cooling operation and vice versa in response to temperature changes in the conditioned air.

6. Air conditioning apparatus comprising heating means, cooling means, and means for maintaining a regulated temperature in the space to be conditioned including means for energizing said heating and cooling means in accordance with the needs of the space to be conditioned, and means for progressively decreasing the heating or cooling power of said heating or cooling means as the space to be conditioned approaches the desired temperature.

7. That improvement in the art of air conditioning which includes the steps of applying heat to air to be conditioned whenever the air temperature drops below a predetermined value, abstracting heat from the air whenever its temperature exceeds a predetermined value, and progressively increasing the addition or abstraction of heat as the temperature of the air moves away from said predetermined values.

8. Air conditioning apparatus comprising heating means, means for supplying fuel to said heating means, an air heater operated by said heating means, a refrigerating system operated by said heating means, an air cooler operated by said refrigerating system, means responsive to the temperature of the space to be conditioned for energizing said fuel supply means, and means responsive to the temperature of the space to be conditioned for connecting said heating means to said air heater or to said refrigerating system, said last mentioned means also changing the temperature at which said fuel supply means is energized by said first mentioned temperature responsive means.

9. Air conditioning apparatus comprising heating means, means for supplying fuel to said heating means, an air heater operated by said heating means, a refrigerating system operated by said heating means, an air cooler operated by said refrigerating system, means responsive to the temperature of the space to be conditioned for energizing said fuel supply means, and means responsive to the temperature of the space to be conditioned for connecting said heating means to said air heater or to said refrigerating system, said last mentioned means also changing the temperature at which said fuel supply means is energized by said first mentioned temperature responsive means, modulating control means for regulating the rate of heat supply to said air heater or said refrigerating system and means responsive to the temperature of the space to be conditioned for regulating said modulating control means.

10. Air conditioning apparatus comprising heating means, means for supplying fuel to said heating means, an air heater operated by said heating means, a refrigerating system operated by said heating means, an air cooler operated by said refrigerating system, means responsive to the temperature of the space to be conditioned for energizing said fuel supply means, and means responsive to the temperature of the space to be conditioned for connecting said heating means to said air heater or to said refrigerating system, said last mentioned means also changing the temperature at which said fuel supply means is energized by said first mentioned temperature responsive means, modulating control means for regulating the rate of heat supply to said air heater or said refrigerating system, means responsive to the temperature of the space to be conditioned for regulating said modulating control means and means operated by said second mentioned temperature responsive means for reversing the connections between said modulating control means and said last mentioned temperature responsive means.

11. Air conditioning apparatus for maintaining desired temperature conditions in a room to be conditioned comprising air heating means, air cooling means, means for rendering said heating means or said cooling means operative in response to room temperature conditions, and modulating control means for automatically varying the heating or cooling power of said air heating and cooling means in response to changes in room temperature.

12. Air conditioning apparatus comprising space heating means, space cooling means, modulating control means for decreasing the heating or cooling power of said heating and cooling means as the temperature of the space to be conditioned approaches predetermined values, and seasonal control means for energizing said heating or cooling means in response to seasonal temperature changes and for conditioning said modulating control means accordingly for heating or cooling operation.

13. Air conditioning apparatus comprising means for heating the space to be conditioned, means for cooling the space to be conditioned, means for energizing said heating and cooling means, means for controlling said energizing means to energize the heating or cooling means in accordance with the needs of the space to be conditioned, and means for progressively decreasing the heating or cooling power of said heating or cooling means as the space to be conditioned approaches the desired temperature.

14. Air conditioning apparatus comprising means for heating the air to be conditioned, means for cooling the air to be conditioned, means for rendering said heating means operative when the temperature of the air drops below a predetermined value and for rendering said cooling means operative when the temperature of the air exceeds a predetermined value, and means for decreasing the heating or cooling power produced by said heating and cooling means as the temperature of the air approaches said predetermined values.

15. That method of conditioning a space which includes the steps of abstracting heat therefrom by passing the air in the space in heat exchange relationship with a source of cold whenever the temperature of such space is above a predetermined seasonal changeover value, progressively increasing the rate of heat abstraction as the temperature of the space increases above such changeover value by increasing the cooling power of the source of cold, adding heat to the space by passing the air in the space in heat exchange relationship with a source of heat whenever the temperature of the space decreases below a seasonal changeover value, and progressively increasing the rate of heat supply by increasing the heating power of the heat source as the temperature of the space decreases below the changeover value.

16. Air conditioning apparatus adapted for maintaining a desired temperature in a room which comprises a source of heat, heating means adapted to transfer heat from the source of heat to the air to be conditioned, a heat operated refrigerating system, cooling means adapted to transfer cold from the refrigerating system to the air to be conditioned, means adapted to transfer heat from the source of heat to said heat operated refrigerating system, and automatic control means for switching the flow of heat from said source of heat either to said heating means or to said refrigerating system in response to temperature conditions in the room being conditioned, said automatic control means including a daily control circuit for controlling the energization of said source of heat and a modulating control circuit for regulating the rate of heat supply to said heating means and to said refrigerating system.

17. That method of maintaining the air in a room at a substantially uniform temperature under varying conditions of outdoor temperature which includes the steps of conducting the air in the room into heat transfer relationship with a body of lower temperature to reduce the temperature of such air when the temperature thereof increases above a predetermined value progressively decreasing the rate of heat absorption by such body of lower temperature as the temperature of the air approaches such predetermined value, conducting the air in the room into heat transfer relationship with a body of higher temperature to increase the temperature of such air when the temperature thereof decreases below a predetermined value, and progressively diminishing the rate of heat rejection by such body of higher temperature as the temperature of the air approaches such predetermined value.

18. Air conditioning apparatus comprising means for heating the space to be conditioned, means for cooling the space to be conditioned, room temperature responsive means for energizing said heating and cooling means in response to a preselected set of conditions, modulating control means for progressively decreasing the heating or cooling effect of said heating or cooling means as the temperature of the space to be conditioned approaches a desired value, and means under the control of said room temperature responsive means for conditioning said modulating control means for heating or cooling operation in accord with the needs of the space to be conditioned.

19. Air conditioning apparatus comprising means for heating the air to be conditioned, means for cooling the air to be conditioned, means for rendering said heating means operative when the temperature of the air drops below a predetermined value and for rendering said cooling means operative when the temperature of the air exceeds a predetermined value, means for decreasing the heating or cooling power produced by said heating and cooling means as the temperature of the air approaches said predetermined values, and means for adjusting said means for controlling the heating or cooling power of said heating and cooling means for heating or cooling operation in response to the condition of the air to be conditioned.

20. Air conditioning apparatus adapted for maintaining a desired temperature in a room which comprises a source of heat, heating means adapted to transfer heat from the source of heat to the air to be conditioned, a heat operated refrigerating system, cooling means adapted to transfer cold from the refrigerating system to the air to be conditioned, means adapted to transfer heat from the source of heat to said heat operating refrigerating system, means for directing the heat from said source of heat to said heating means and to said refrigerating system in response to temperature conditions in the air being conditioned, and means operative to regulate the quantity of heat supplied to said heating means and to said refrigerating system in response to small changes in the temperature of the air being conditioned.

DONALD G. SMELLIE.

CERTIFICATE OF CORRECTION.

Patent No. 2,257,540. September 30, 1941.

DONALD G. SMELLIE.

It is hereby certified that error appears in the printed specification of the above numbered patent requiring correction as follows: Page 5, lines 28 and 29, claim 19, for "produced by" read --of--; and that the said Letters Patent should be read with this correction therein that the same may conform to the record of the case in the Patent Office.

Signed and sealed this 10th day of February, A. D. 1942.

(Seal)

Henry Van Arsdale,
Acting Commissioner of Patents.